Aug. 28, 1962   W. L. GASKELL   3,051,204
MITER GAUGE
Filed Sept. 29, 1958   3 Sheets-Sheet 2
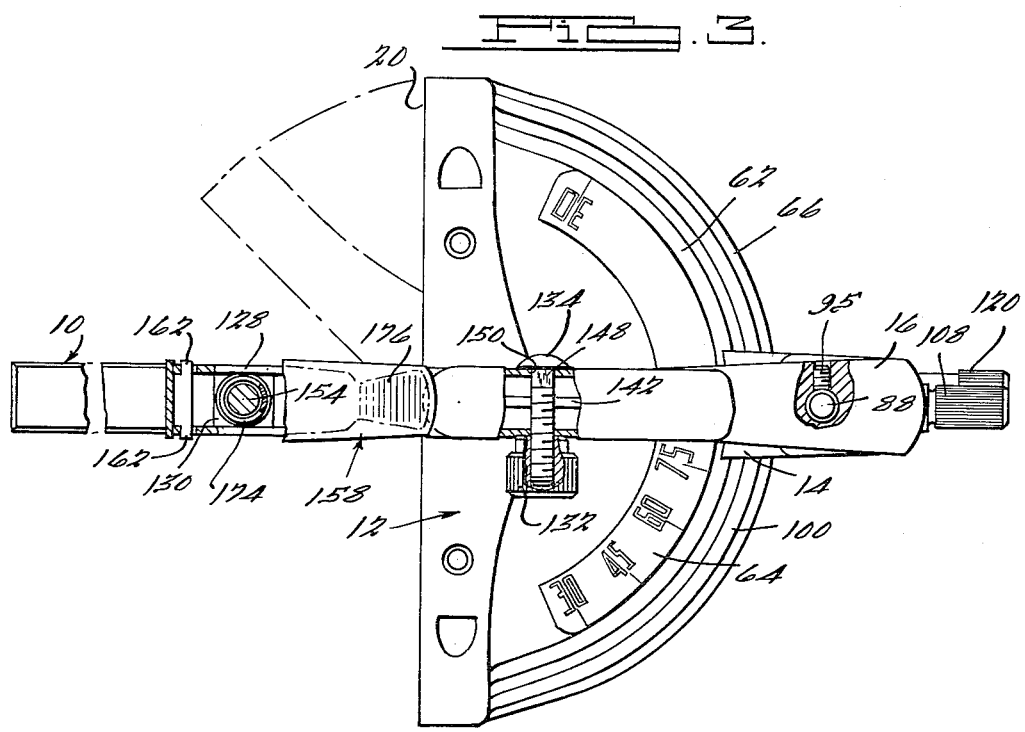
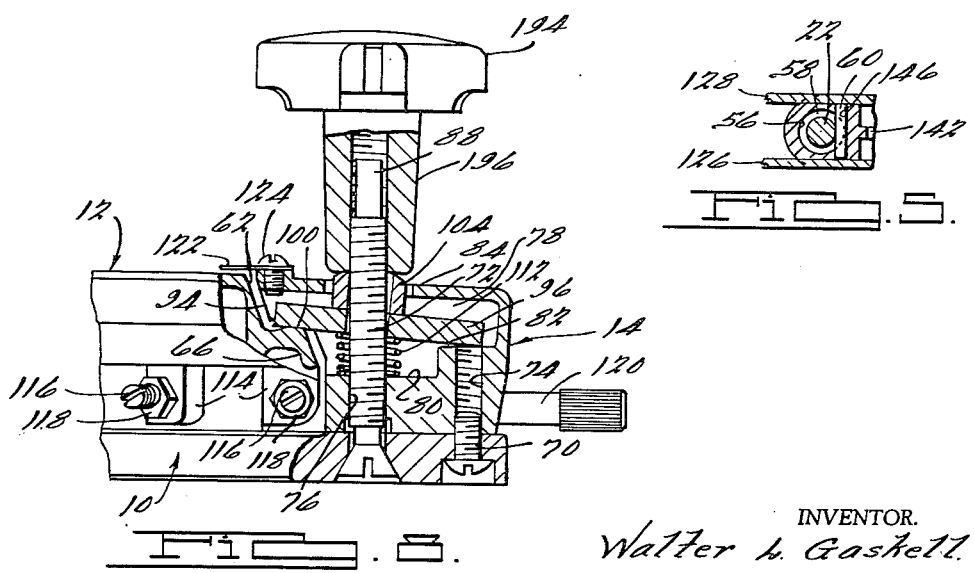
INVENTOR.
Walter L. Gaskell
BY
Harness, Dickey & Pierce
ATTORNEYS.

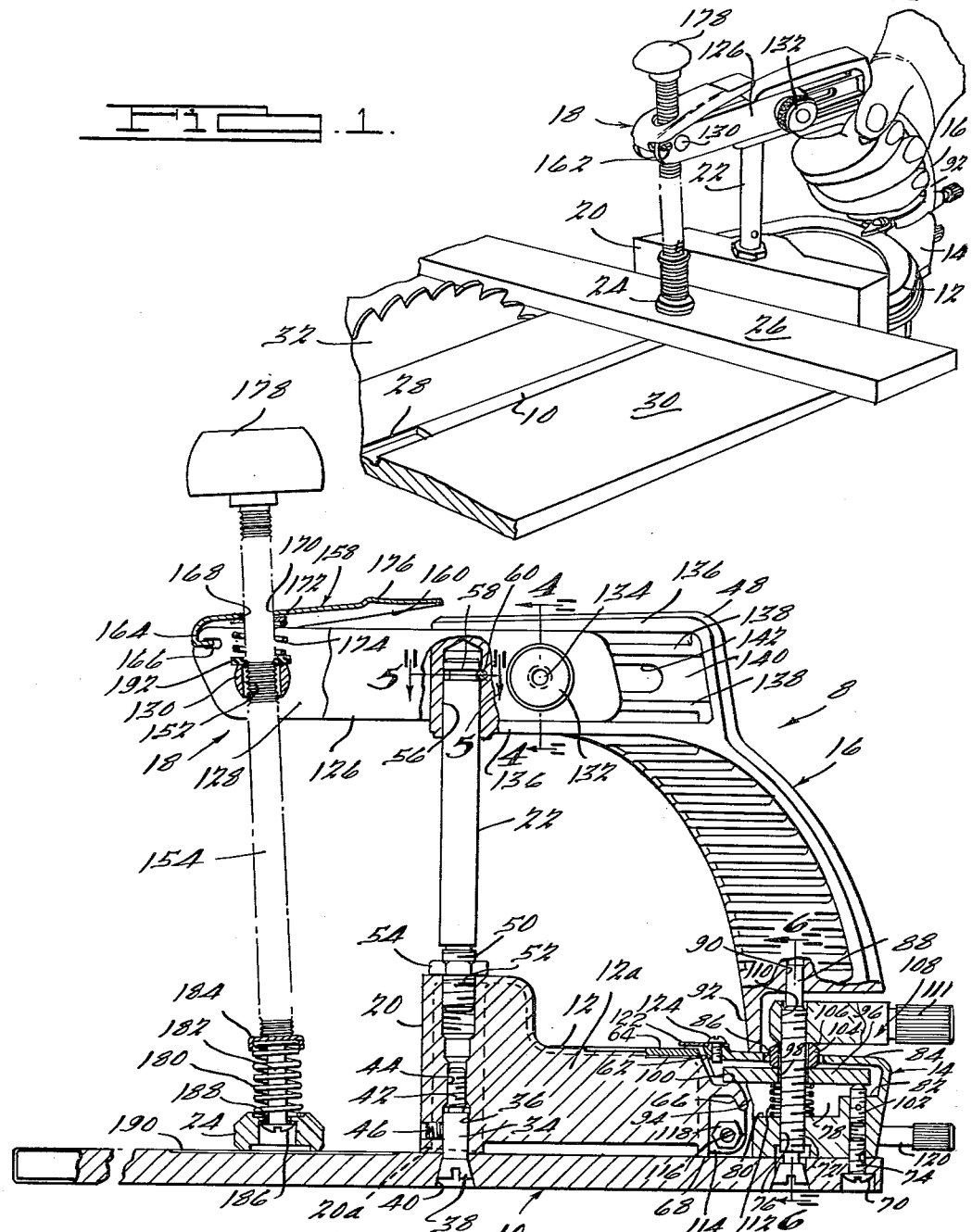

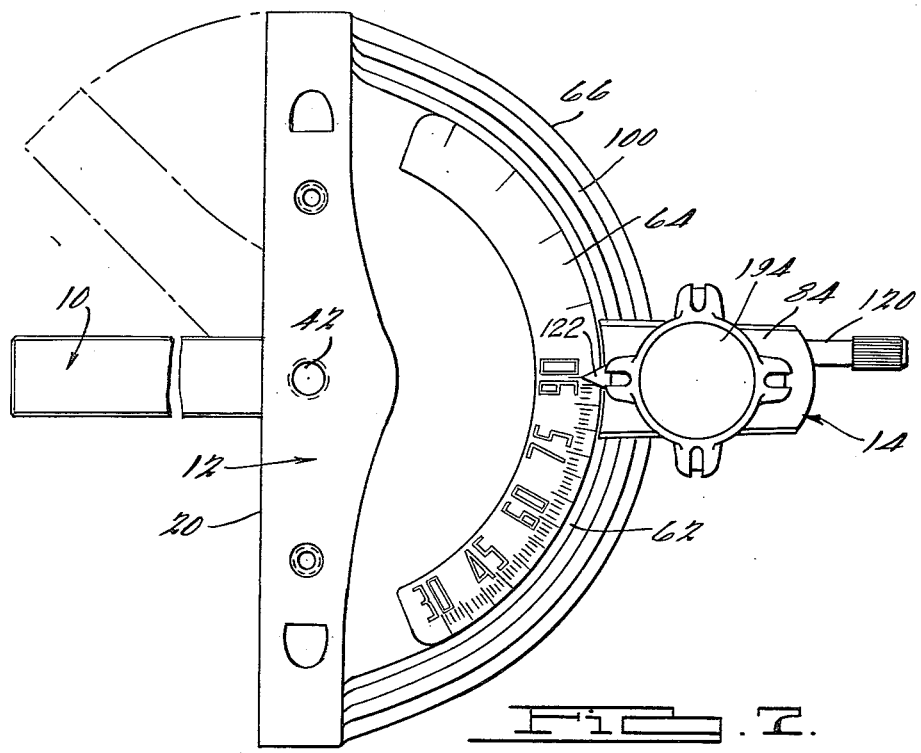

United States Patent Office 3,051,204
Patented Aug. 28, 1962

3,051,204
MITER GAUGE
Walter L. Gaskell, Ypsilanti, Mich., assignor to King Seeley Thermos Co., a corporation of Michigan
Filed Sept. 29, 1958, Ser. No. 764,024
3 Claims. (Cl. 143—169)

This invention relates to miter gauges of the type commonly used with woodworking tools, such as home workshop arbor saws, and particularly to a combination miter gauge and work-holding device adapted to be slidably mounted on a worktable.

It is one object of the invention to provide a miter gauge which can be quickly and securely clamped in a desired angular position.

It is another object of the invention to provide a miter gauge that can be quickly clamped in a desired angular position in a manner that reduces the tendency of the miter gauge to creep or change its angular position as it is being clamped.

It is a further object of the invention to provide a miter gauge on which a hand grip and work-holding device can be mounted.

It is a still further object of the invention to provide a work-holding device that can be quickly moved into engagement with a workpiece to clamp it into position.

It is a still further object of the invention to provide a work-holding device that is free to be moved into engagement with a workpiece to clamp it but cannot be moved in a direction away from the workpiece until a quick release mechanism is actuated.

It is a still further object of the invention to provide a hand-grip type miter gauge and work-holding device that is relatively inexpensive to manufacture, simple to operate, and rugged in construction.

Other objects and features of my invention will become apparent upon consideration of the accompanying drawings, wherein:

FIGURE 1 is a perspective view illustrating the miter gauge and work-holding device of the present invention slidably mounted on the table of a woodworking arbor saw;

FIG. 2 is a side elevational view of the miter gauge and work-holding device of the present invention partially broken away;

FIG. 3 is a plan view of the structure of FIG. 2 partially broken away;

FIG. 4 is a sectional view of the structure illustrated in FIG. 2, taken along the line 4—4 thereof;

FIG. 5 is a sectional view of the structure illustrated in FIG. 2, taken along the line 5—5 thereof;

FIG. 6 is a sectional view of the structure illustrated in FIG. 2, taken along the line 6—6 thereof;

FIG. 7 is a plan view illustrating a modification of the miter gauge of the present invention with the hand grip and work-holding device removed; and FIG. 8 is a side elevational view partially broken away of the structure illustrated in FIG. 7.

Referring to the drawings and particularly to FIGS. 1–3 the combination miter gauge and work-holding device 8 of the present invention is comprised of an elongated bar 10, a protractor body 12, and an index housing 14, to all of which a hand grip 16 and a work-holding device 18 may be selectively attached. The protractor body 12 is pivotally mounted on the bar 10 by a pin 34 disposed near the center of the vertical work abutment face 20, and the index housing 14 is fixed to the end of the bar 10 adjacent the arcuate edge of the protractor body. The hand grip 16 has the lower end thereof mounted upon the index housing 14 and the upper end thereof pivotally receives the top end of an elongated stud 22 which is in coaxial alignment with the pin 34.

The work-holding device 18 is telescopically mounted on the upper end of the hand grip 16 in a manner to be described, and has a spring-mounted foot 24 on the lower end thereof which is adapted to clamp a wood workpiece 26 against the bar 10 and hold it tightly square against the face 20.

The bar 10 is adapted to be slidably disposed in a slot 28 of the worktable 30 which is parallel to the plane of the saw blade. The operator may grasp the hand grip 16 with one hand as illustrated in FIG. 1 to slide the device 8 past the rotary saw blade 32 to cut off the end of the workpiece, the vertical face 20 of the protractor body being set at the desired angle relative to the bar 10 so that the end of the workpiece is cut off at a desired angle. It will also be observed that the horizontal bottom of the vertical face 20 on opposite sides of bar 10 is tapered slightly at 20a to prevent catching or snagging on the top edge of the worktable when the protractor body 12 is advanced toward the saw from a position just beyond the edge of the worktable with the bar 10 in slot 28.

As most clearly illustrated in FIG. 2, the protractor body 12 is pivotally mounted at the center of its arcuate edge on the bar 10 by the pin 34 which is disposed within a cylindrical bore 36 of the protractor body. One end of the pin 34 has a truncated conical head 38 which is recessed in a tapered aperture 40 in the bar 10 and the other end thereof has a reduced threaded portion 42 which threadably engages an internally threaded portion 44 of the protractor body 12 to draw the head 38 of the bolt snugly within the tapered aperture 40 and to retain the protractor body 12 against the bar 10. A suitable setscrew 46 or the like is provided for engaging the pin 34 to prevent rotation between the pin and the protractor body, pivotal movement of the protractor body relative to the bar 10 being accomplished by rotation between the pin 34 and the bar 10 in aperture 40.

The horizontal upper portion 48 of the hand grip 16 is in turn pivotally supported on the protractor body 12 by the elongated stud 22 which has a threaded portion 50 on the lower end thereof that threadably engages an internally threaded bore 52 adjacent the top of the protractor body 12, a jam nut 54 being provided to lock the threaded portion 50 within the internally threaded bore 52. The upper end of the elongated stud 22 pivots in a cylindrical bore 56 in the upper portion 48 of the hand grip, and has an annular groove 58 adjacent the end thereof. A pin 60 is slidably disposed within a suitable aperture extending transversely through the upper portion 48 and has a portion thereof passing through the annular groove 58 to hold the hand grip on the stud but to permit rotation of the stud.

Referring to FIG. 3, as well as FIG. 2, it will be observed that the protractor body 12 has a semicircular arcuate wall 62 with an arcuate scale 64 secured adjacent thereto which is calibrated in degrees to indicate the angular position of the protractor body relative to the bar 10 and thus relative to the saw blade. The arcuate wall 62 also has an arcuate downwardly turned flange 66 projecting radially outwardly therefrom for a purpose which will be described in greater detail hereinafter. It will also be observed that the protractor body 12 is of hollow diecast construction with strengthening webs 12a to provide a savings of material and reduce the cost thereof, and that the lower periphery 68 of the arcuate wall 62 rests on the bar 10 to support the outer edge 62 of the protractor body 12, as viewed in FIG. 2.

As previously described, the index housing 14 is rigidly secured to the end of the bar 10 adjacent the arcuate wall 62 of the protractor body. This is accomplished by two screws 70 and 72 which threadably engage internally threaded portions 74 and 76, respectively, of the housing 14, the heads of the screws being suitably recessed within the bar 10 so as not to project beyond the lower surface thereof. It will be observed that the housing 14 has a cavity 78 therein defined in part by a surface 80, a shoulder 82, top 84, and sidewalls 94.

It will also be observed that the screw 72 is elongated so as to extend through an aperture 86 in the top 84, and that it has a non-threaded portion 88 of reduced diameter on the end thereof which projects into a bore 90 in the lower end of the hand grip 16 for supporting the hand grip.

Referring to FIG. 6, as well as FIGS. 2 and 3, flanges 92 project downwardly from two sides of the lower end of the hand grip 16 to partially enclose the space between the hand grip and top of the housing and a setscrew 95 is provided in the wall of the hand grip 16 at the lower end thereof for engaging the non-threaded portion 88 of the screw 72 to lock the hand grip on the non-threaded portion.

It will be observed that the top 84 of the housing 14 extends over the arcuate flange 66 and has an arcuate edge that lies closely adjacent to the arcuate wall 62 while side walls 94 follow the contour of the upper portion of the arcuate wall 62 and the arcuate flange 66. A clamping plate 96 having an enlarged central aperture 98 therein is slidably disposed over the threaded portion of the screw 72 with one end thereof resting on a raised lip 100 of the arcuate flange 66 and the other end thereof resting on a threaded stud 102 projecting from the upper end of the internally threaded portion 74 of the housing 14.

A bushing 104 having a truncated substantially spherical surface 106 on the upper end thereof is slidably disposed over the threaded portion of the screw 72 and within the enlarged aperture 86 in the top 84 so as to rest upon the clamping plate 96. A locking lever 108 is provided for clamping the plate 96 and has a transverse internally threaded bore 110 on one end thereof threadably engaging the upper end of the threaded portion of the screw 72, and a knurled knob 111 on the other end thereof. The threaded portions of the screw 72 and locking lever 108 have a relatively low number of threads per inch (such as a double lead thread) so that the locking lever 108 is advanced axially of the screw 72 a sufficient distance to clamp the plate 96 tightly when the lever 108 is pivoted through a quarter turn. The screw 102 has a socket in its lower end which can be reached by removing screw 70, and by turning screw 102 to vary the height of plate 96 it is possible to adjust the parts to get proper clamping action in a 90° turn of the lever 108. A suitable spring 112 extends over the screw 72 between the clamping plate 96 and the surface 80 of the housing to normally urge the clamping plate and the bushing 104 upwardly away from lip 100 to permit free pivotal movement of the protractor body 12.

In this position the locking lever 108 would be pivoted 90 degrees in a counterclockwise direction when viewed from above in FIG. 2 so that it projects laterally outwardly from the lower end of the hand grip 16. To clamp the protractor body against pivotal movement, the locking lever is simply pivoted back into the position illustrated in FIG. 2 wherein it is substantially parallel to the bar 10 and projects rearwardly from the lower end of the hand grip 16. The resultant axial movement of the locking lever forces the clamping plate 96 downwardly against the action of the spring 112 and against the lip 100 to lock the protractor body 12 against pivotal movement.

Referring to FIG. 8, as well as FIG. 2, three ribs 114 (located substantially 45° apart) extend radially outwardly from the arcuate wall 62 beneath the arcuate flange 66 and each rib is provided with a threaded stud 116 threadably engaging a nut 118 secured to each of the ribs 114. An index pin 120 extends through the housing 14 in a manner to permit limited sliding movement thereof so that it can be moved to the left (in) wherein the end thereof is in position to be contacted by the threaded studs 116 on the ribs 114 and to the right (out) wherein it clears the ribs 114. Detents (not shown) may be provided to hold the pin 120 in either position. When the index pin 120 is moved to the left the protractor body 12 can only be pivoted until one of the threaded studs 116 engages the left or inner end of the index pin 120. This can be used to indicate a predetermined angular position of the protractor body relative to the bar 10, such as the 45 degree or 90 degree positions for example, each threaded stud providing an indication of one of these positions.

To advance the protractor body beyond any of these positions, the index pin 120 is simply pulled outwardly to the right so that the threaded studs and ribs are free to pivot past the left end thereof. In addition, the threaded studs may be turned inwardly or outwardly of their respective nuts 118 to provide a fine adjustment for precisely setting each one of these intermediate stop positions. A pointer 122 is mounted on the upper end of the top 84 of the housing 14 by a screw 124 so as to overlie the arcuate scale 64 to indicate the exact position of the protractor body 12 relative to the bar 10.

Referring now to FIGS. 4 and 5, as well as to FIGS. 2 and 3, the work-holding device 18 is comprised of two flat, parallel, spaced-apart supporting members 126 and 128 which are connected together at their free ends by peened over outside ends of non-rotatable guide block 130 having the shape shown in FIG. 2, with the other ends thereof slidable on the upper portion 48 of the hand grip 16 but fixed in position by a knurled nut 132 and bolt 134. It will be observed that each of the members 126 and 128 are telescopically mounted on the upper portion 48 by slidably disposing them between laterally projecting shoulders or flanges 136 along the upper and lower edges of the upper portion 48 to the rear of the bore 56, the members being spaced laterally by bearing ribs 138 projecting laterally from a web 140 interconnecting the ribs 136.

A suitable elongated slot 142 is provided in the web 140 of hand grip 16 to permit the bolt 134 to pass therethrough in a manner to limit the telescoping action of the members 126 and 128 to the length of the elongated slot 142. As seen in FIG. 5, the transverse bore 146 receives the pin 60 so that it overlaps a portion of the bore 56 and projects within the annular groove 58 to retain the stud 22 therein as previously described.

As most clearly illustrated in FIG. 4, the bolt 134 is provided with a square or otherwise non-circular portion 148 adjacent the head thereof which fits within a similarly shaped aperture in the wall of the member 128 to prevent rotation of the bolt 134 as the nut 132 is tightened on the end thereof.

As most clearly illustrated in FIGS. 2 and 3, the guide block 130 has an enlarged aperture 152 extending transversely therethrough with the axis thereof at an angle to the vertical and inclined toward face 20 to slidably receive and guide a threaded or grooved elongated rod 154. The ends of the guide block 130 are slightly reduced in diameter to form outwardly facing shoulders to space the members 126 and 128.

A flat latch operating member 158 having downwardly extending flanges 160 along the side edges thereof is pivotally connected to the end of each of the members 126 and 128 by ears 162 projecting laterally outwardly from a reduced end portion 164 thereof which fits between the ends of the members 126 and 128, the ears 162 projecting within suitable apertures 166 in each of the members 126 and 128. The downwardly extending flanges 160 are preferably spaced apart a greater distance than the members 126 and 128 so as to pass on either side thereof when the latch member 158 is pivoted downwardly in a clockwise direction, as viewed in FIG. 2, until the flat portion thereof rests on the upper edge of the members. A suitable elongated aperture 168 is provided in the latch member 158 to permit the latch member to extend over the rod 154 and to be pivoted relative thereto, the pivoting being limited in one direction by the members 126 and 128 and in the other direction, the counterclockwise direction, by contact between a point 170 on the edge of the aperture 168 and the rod 154.

A steel washer 172 is slidably disposed over the rod 154 and between a spring 174 and the member 158, the other end of the spring 174 being based against the guide block 130 either directly or through the element 192 described hereinafter. With this construction, the member 158 is normally urged to the position illustrated in FIG. 2 and the steel washer 172 is cocked so that it engages the threads or grooves of the rod 154 to prevent movement of the rod in an upward direction. However, the cocked washer 172 acts like a ratchet pawl to permit the rod 154 to be advanced downwardly relative thereto similar to the manner in which a ratchet permits movement in one direction but prevents movement in the other. Thus, the rod 154 can be pushed down at all times but cannot be raised unless handle 158 is depressed to square up washer 172.

An enlarged knob 178 is affixed to the upper end of the threaded rod 154 and the foot 24 is flexibly mounted on the lower end thereof by a spring 180 disposed over a reduced lower end portion 182 and between the foot 24 and a cup-shaped thrust washer 184, the thrust washer 184 slidably bearing against the shoulder formed at the juncture of the end of the threaded portion of the rod 154 and the reduced end portion 182. A screw having an enlarged head 186 threadably engages an internally threaded aperture (not shown) in the reduced end portion 182 and extends through an enlarged opening in and abuts against an annular flange 188 on the foot 24 to retain the foot on the end of the reduced end portion 182. With this arrangement the foot will be flat against a workpiece even though rod 154 is inclined toward face 20. Longitudinal ribs or serrations 190 on the top bar 10 also help grip the workpiece 26. If desired to prevent the head of screw 186 from being pressed against the work, a sleeve (not shown) may be inserted inside of spring 180 over rod 182 to limit collapsing of the washer 184 toward the foot.

After the foot 24 engages the workpiece, additional pressure may be applied to compress the spring 180 a desired amount and tightly hold the workpiece. Thereafter when the operator releases the knob 178 the rod 154 cannot be pushed upwardly by the spring because the washer 172 is cocked and prevents upward movement of the rod. Consequently, the workpiece is firmly clamped between the foot 24 and the bar 10 by the pressure of the spring 180, and in addition is firmly urged against the work abutment face 20 by the force resulting from the incline of rod 154. After the cut is completed and it is desired to release the workpiece, the member 158 is pivoted downwardly to release the washer 172 so that the spring 180 will expand and push the rod 154 upwardly to free the workpiece. Of course, with the latch member 158 pivoted downwardly in this manner, the rod 154 is free to be pulled completely away from the workpiece. To facilitate actuation of the work-holding device, the pivoting end of the latch member 158 is suitably curved to provide a convenient thumb press portion 176 which may be corrugated or roughened, as most clearly seen in FIG. 3.

If desired, a rubber washer 192 may be disposed between the guide block 130 and the spring 174 so as to frictionally engage the rod 154 to control its tendency to pop or jump up due to force of expanding spring 180 when the hold-down is released.

The work-holding device 18 may be removed by disengaging the members 126 and 128 from the upper portion 48 of the hand grip 16 so that the device of the present invention may simply be used as a miter gauge with a hand grip. It is also readily apparent that the hand grip 16 may be removed so that the miter gauge may be used alone.

When the miter gauge is used alone, as illustrated in FIGS. 7 and 8, the locking lever 108 is preferably replaced by a knob 194 having an internally threaded sleeve 196 projecting downwardly therefrom. The sleeve 196 threadably engages the upper end of the threaded portion of the bolt 72, and the lower end of the sleeve 196 engages the spherical surface of the bushing 104 as did the locking lever 108. The remaining elements of the protractor body 12 and index housing 14 are the same as previously described and consequently the knob 194 can be rotated to increase or decrease the pressure of the clamping plate 96 on the lip 100 of the arcuate flange 66.

It will be observed in FIG. 8 that the threaded stud 102, illustrated in FIG. 2, may be omitted (or screwed down so far that it does not project out of the top of hole 74) and that the right end of the clamping plate 96 rests directly upon the internal shoulder 82 of the housing 14. It is apparent that since the handle 194 with the internally threaded sleeve 196 can be rotated any number of turns, the axial movement thereof is not limited as is the axial movement of the locking lever 108. Therefore, the adjustment provided by the stud 102 is not required in the embodiment of FIGS. 7 and 8 although it is desirable in the embodiment of FIG. 2 since it insures that the locking lever tightly clamps the clamping plate against the arcuate flange 66 when the locking lever is pivoted to the position illustrated in FIG. 2. As most clearly illustrated in FIG. 7, the edge of the top 84 of the housing 14 adjacent the arcuate wall 62 and to which the pointer 122 is attached, is slightly curved so as to conform to and be slightly spaced from the arcuate wall 62.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a tool comprising a bar adapted to be slidably mounted on a worktable, a handgrip secured to and extending generally normally upwardly from the bar, and a supporting arm having one end thereof mounted on said hand grip with the other end thereof overlying a portion of the bar, the improvement comprising a rod slidably mounted on the other end of the arm, one end of said rod adjacent the bar being adapted to engage a workpiece and cooperate with the bar to clamp the workpiece therebetween, and quick release means mounted on the other end of the arm comprising resilient means normally biasing said rod away from the bar, ratchet means directly and releasably engaging the rod to normally prevent movement thereof in a direction away from the workpiece and freely permit movement thereof in a direction toward the workpiece, and a latch member on the arm and movable to effect disengagement of said ratchet means from said rod to free said rod for movement away from the bar under the bias of said resilient means thereby to quickly unclamp the workpiece.

2. In combination with a tool having a hand grip adapted to be slidably mounted on a worktable, a work-holding device comprising a supporting arm disposed above and in substantially parallel spaced-apart relation with said worktable and having one end thereof telescopically mounted on the upper portion of said hand grip, a threaded rod slidably mounted on the other end of said arm and extending toward said worktable, the end of said rod adjacent the worktable having a spring-mounted foot thereon adapted to clamp a workpiece against the worktable, a latch member slidably disposed over the upper end of said rod and having one end thereof pivotally connected to said other end of said arm, the pivotal movement of said latch member in a direction away from said arm being limited by engagement with said rod, a spring disposed between said arm and said latch member, a spring steel washer having an enlarged aperture therein disposed over said rod between said spring and latch member, the spring and latch member normally retaining the washer in a cocked position whereby the washer engages the thread of the rod to prevent movement of the rod away from said workpiece but to permit movement thereof toward the workpiece, said washer being disengaged from the threaded rod to permit the rod to be moved away from said worktable by the pivotal movement of said latch member toward said arm.

3. The subject matter as claimed in claim 2 including a rubber washer disposed between the arm and the latch member and frictionally engaging the rod to prevent it from jumping up when the latch member is pivoted to release the rod.

References Cited in the file of this patent

UNITED STATES PATENTS

| | | |
|---|---|---|
| 1,560,748 | Wilderson | Nov. 10, 1925 |
| 1,577,868 | Muller | Mar. 23, 1926 |
| 1,894,010 | Tautz | Jan. 10, 1933 |
| 1,944,116 | Stratman | Jan. 16, 1934 |
| 1,985,614 | Merrigan | Dec. 25, 1934 |
| 2,315,458 | Sellmeyer | Mar. 30, 1943 |
| 2,401,972 | Sellmeyer | June 11, 1946 |
| 2,554,884 | Smith | May 29, 1951 |
| 2,759,503 | Goldschmidt | Aug. 21, 1956 |
| 2,782,819 | Levy | Feb. 26, 1957 |
| 2,785,709 | Shepp | Mar. 19, 1957 |
| 2,796,899 | Biro | June 25, 1957 |
| 2,857,943 | McEwan | Oct. 28, 1958 |